Nov. 9, 1965 R. M. HUGHES ETAL 3,217,254
SWITCHING SYSTEM FOR RADIO-TELEPHONE SYSTEM
Filed Nov. 26, 1962 2 Sheets-Sheet 1
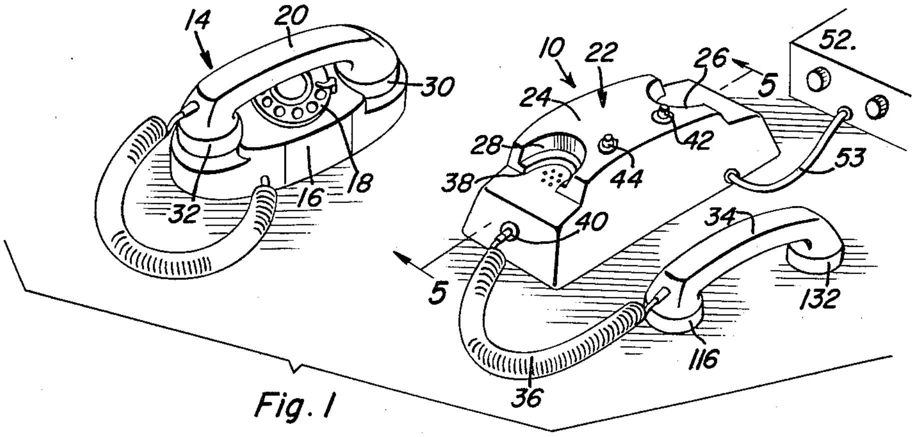
Fig. 1
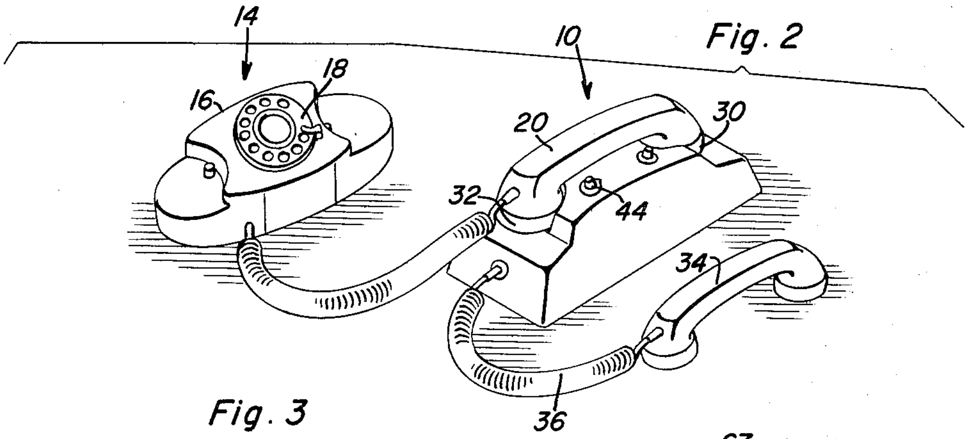
Fig. 2
Fig. 3
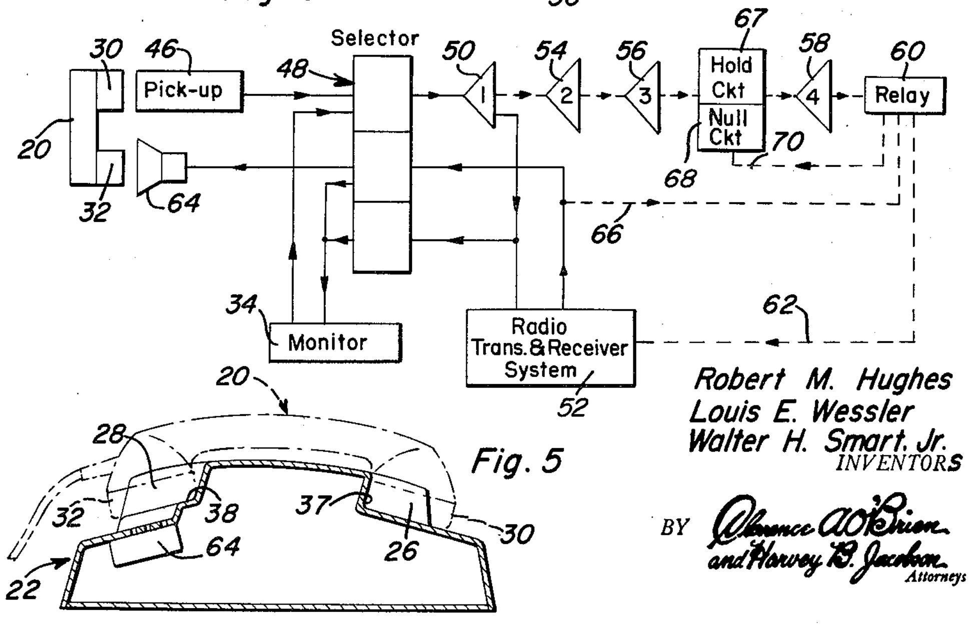
Fig. 3, Fig. 5
Robert M. Hughes
Louis E. Wessler
Walter H. Smart, Jr.
INVENTORS
BY Clarence A. O'Brien and Harvey B. Jacobson
Attorneys

SWITCHING SYSTEM FOR RADIO-TELEPHONE SYSTEM

Filed Nov. 26, 1962

Robert M. Hughes
Louis E. Wessler
Walter H. Smart, Jr.
INVENTORS

BY Clarence A. O'Brien
and Harvey B. Jacobson
Attorneys

United States Patent Office 3,217,254
Patented Nov. 9, 1965

3,217,254
SWITCHING SYSTEM FOR RADIO-TELEPHONE SYSTEM

Robert M. Hughes, 109 Briarcliff Drive, Folsom, Calif.; Louis E. Wessler, 2331 E. Sierra Madre Court, Rancho Cordova, Calif.; and Walter H. Smart, Jr., 2401 Benita Drive, Rancho Cordova, Calif.

Filed Nov. 26, 1962, Ser. No. 240,025
3 Claims. (Cl. 325—22)

This invention relates to new and useful apparatus for establishing a communication between a two-way radio or transceiver and the telephone subset or instrument of presently available wire telephone communication systems. More particularly, the apparatus of the present invention is automatically operative to establish a two-way conversation between a telephone system subscriber and a person having only radio facilitites.

It is therefore a primary object of the present invention, to provide apparatus adapted to be electrically connected to any suitable two-way radio or transceiver as the intercommunication link without requiring any electrical connections to the telephone instrument through which the intercommunication link is established. A two-way conversation may thereby be established between a telephone subscriber and a person located in a remote area, for example, having only the facilitites of a radio, the intercommunication link being established without requiring any supervision over the interconnection once established.

Another object of the present invention is to provide a message interconnecting device between a telephone instrument and a transceiver wherein the interconnection is established merely by placing the telephone instrument handset on a cradle support provided by the interconnecting device.

An additional object of the present invention is to provide an intercommunication device as set forth in the foregoing objects, which also features a monitoring handset connected to the intercommunication device. Messages originating either from the telephone lines or from the transceiver, may be monitored.

A still further object of the present invention is to provide a telephone-radio intercommunication device having voice controlled facilitites for automatically conditioning the transceiver for either transmitting or receiving operation.

Yet another object of the present invention is to provide a multi-purpose radio intercommunication device having the aforementioned voice control feature which is also operative in conection with use of the handset of the device in conducting normal two-way radio conversations.

A further object of the present invention is to provide a multipurpose radio-telephone intercommunication device having the aforementioned voice-controlled facilities and adapted to provide intercommunication between a telephone and a short-range transceiver, and to provide a compact short-range voice-controlled transceiver.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the intercommunication device and associated radio transceiver and telephone instrument through which the telephone-radio interconnection is established.

FIGURE 2 is a perspective view showing the intercommunication device and telephone in an interconnecting arrangement.

FIGURE 3 is a schematic diagram illustrating the underlying pricniples of the system of the present invention.

FIGURE 5 is a partial sectional view of the intercommunication device, taken substantially through a plane indicated by section line 5—5 of FIGURE 1.

Figure 4:
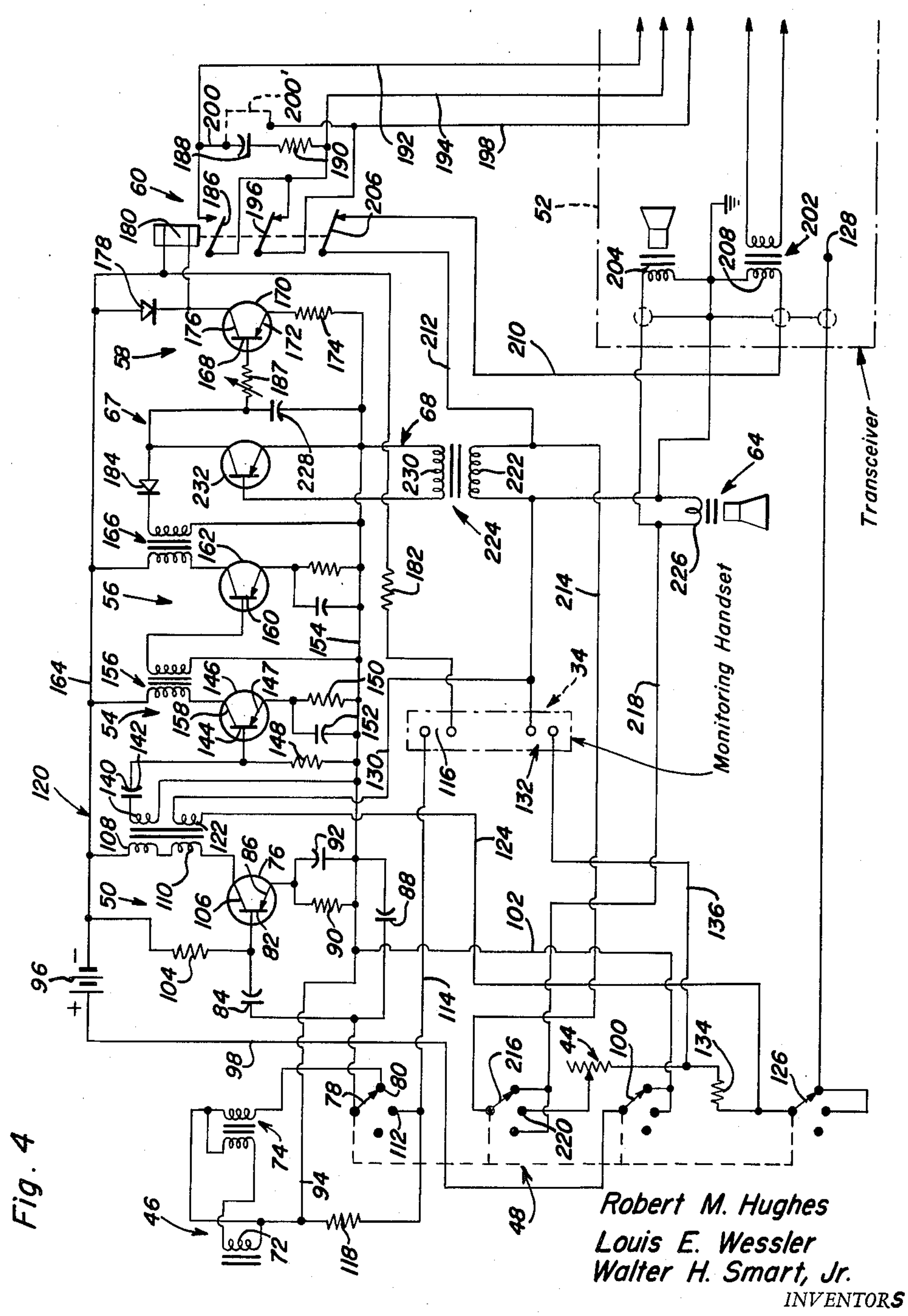
FIGURE 4 is an electrical circuit diagram associated with the intercommunication device of the present invention.

Referring now to the drawings in detail, it will be observed from FIGURES 1 and 2, that the intercommunication device of the present invention, generally referred to by reference numeral 10 is associated with any form of conventional telephone instrument generally referred to by reference numeral 14 which includes the instrument base portion 16 mounting the dialing mechanism 18 and having connected thereto the usual telephone handset 20 adapted to be cradled on the base portion 16 for depressing the cradle switch in a manner well known to those skilled in the art. The telephone handset is provided at opposite ends thereof, with an earphone portion 30 through which messages are received by some sort of speaker device disposed therein and a microphone portion 32 through which messages may be dispatched to the telephone lines. The device 10 similarly is provided with a cradle housing 22 having a raised central portion 24 terminating in arcuate recesses 26 and 28 for respectively supporting the earphone end 30 and microphone end 32 of the telephone handset 20 as illustrated in FIGURE 2. Alternatively, the cradle housing 22 may support thereon, a monitoring handset 34 which is similar in construction and operation to the telephone handset 20, the monitoring handset being electrically connected to the device 10 by the electrical cord connection 36.

It will be observed from FIGURE 5 that the recess 26 includes a negative relief portion 37 to firmly support the handset on the housing 22 shown in a horizontal position with the earphone end of the handset at the level of the microphone end supported on an arcuate shoulder portion 38 in recess 28 so that the pick-up device in the microphone end 32 will be spaced from the apertures 40 formed in the cradle housing 22 through which the audio output of a speaker 64 mounted within the housing 22 may be delivered both to the pick-up device within the microphone end 32 of the handset 20 when placed thereabove and to persons within the immediate vicinity of the device 10. It will also be apparent that the housing 22 may be mounted in a vertical position with the handset 20 suspended from its earphone end 30 firmly held in the recess 26 because of the negative relief portion 37. Also mounted on the intermediate portion 24 of the housing 22, is a selector switch 42 by means of which the device 10 may be conditioned for message intercommunication or alternatively to provide an associated transmitter-receiver or transceiver 52 with the voice-controlled switching facilities of the device 10 by use of the monitoring handset 34 as will hereafter be expained. The volume of the audio output from the device 10 as heard through handset 34, may be regulated through a volume control device 44 also mounted on the intermediate portion 24 of the device 10.

It will become apparent that if a person with a two-way radio or transceiver wishes to communicate with a telephone subscriber, he may simply call a transceiver owner possessing the device 10 and request a phone connection to a desired telephone number. The telephone subscriber may then be dialed by the dialing mechanism 18 of the telephone instrument 14 and the telephone handset 20 placed upon the cradle housing 22. Automatically supervised, two-way conversations may then be conducted. On the other hand, should a telephone subscriber, request the interconnection, the transceiver owner possessing the device 10 after contacting the requested party by radio, will again simply place the telephone handset 20 on the cradle housing 22 for establishing the telephone to radio interconnection. Through use of the monitoring handset 34, monitoring of both sides of the conversation may be accomplished as the conversation is conducted both ways by voice control switch.

The device 10 may also be used to improve operation of the standard selectively controlled microphone usually associated with transceiver operation. This is accomplished by setting the selector switch 42 to the radio-communication position enabling the transceiver 52, connected by cable 53 to the device 10, to be operated remotely with automatic voice-controlled switching through the use of the handset 34. The volume control 44 may be adjusted in this regard to control the audio level of sound emanating from the earphone of the handset. In this usage of the invention, the commercial telephone is not involved. Thus, the transceiver 52 may be located at a considerable distance from the device 10, out of hearing range. When the switch 42 is in the "off" position and a remote radio operator calls, the speaker 64 mounted within housing 22 will emit the sound through holes 40, clearly audible to persons in the vicinity inasmuch as the monitoring handset 34 is spaced above the apertures 40. The person operating the device may therefore respond by turning the switch 42 to the radio-communication position, and communication conducted through the monitoring handset 34 with the calling radio party using standard radio procedures but without having to physically operate the transceiver. If inter-communication between the remote radio party and a telephone party is desired, the switch 42 is turned to the telephone-radio connection position and the interconnection procedure as previously described can then be employed, allowing both sides of the conversation to be heard via the earpiece 132 in the handset 34. When the radio-telephone conversation is completed, the person operating the device 10 turns the switch 42 back to the radio-communication position to clear the station with normal radio operating procedures before turning the switch 42 to the "off" position so that unit 52 may pick up incoming radio calls as indicated hereinbefore.

Referring now to FIGURE 3 in particular, the system which underlies the operation of the communication device, is diagrammatically illustrated. It will therefore be observed, that the device is provided with a pick-up component 46 which is operatively positioned with respect to the telephone handset 20 so that it may receive a signal corresponding to the audio signal emanating from the earphone end 30 thereof. An audio input signal is thereby delivered through a selector control assembly 48 to a signal amplifying component 50 so that amplified modulating signals may be delivered to the input of a transceiver or two-way radio 52. Simultaneously with the signal amplification referred to, further amplification of the audio signal by multi-stage amplifiers 54 and 56 will be operative through a time delay circuit 67 and amplifier 58 to establish an energizing current for the relay component 60 through which a time-delayed control signal 62 may be provided for placing the transceiver 52 in a transmitting condition so that the audio signal input thereto from the amplifier 50 may be transmitted to a remotely located party. It will also be observed, that the audio signal output from the amplifier 50 may also be delivered through the selector control assembly 48 to the monitoring handset 34. Also, when the transceiver 52 is in a receiving condition, the audio output signals from the transceiver may be delivered through the selector control assembly 48 to the monitor 34 as well as to the speaker device 64 operatively positioned below the apertures 40 in relation to the microphone end 32 of the telephone handset 20 so that the remotely located party may speak to the telephone subscriber.

It will be observed that when the transceiver is receiving, the audio output thereof will also establish a control signal 66 connected through relay 60 in its deenergized state and via line 70 to a null circuit 68 which is connected to hold circuit 67 by means of which any signal is conducted through a low resistance path to prevent development of energizing current by the amplifier 58. The control signal 66 will therefore be operative to effectively prevent the establishment of energizing current in the relay 60 necessary to place the transceiver in a transmitting condition. However, the signal 66 will be so effective on the null circuit 68, only when the relay component 60 is deenergized because of the control interconnection 70 diagrammatically illustrated. Also, the null circuit 68 will be operative to prevent energization of the relay 60 only after a predetermined pause in conversation originating with the telephone subscriber. Thus, automatic switching in response to voice control may be effected in order to properly condition the transceiver for transmission or receiving operation.

It will also be observed from FIGURE 3, that the monitor 34 alternatively receives input audio signals from either the amplifier 50 or the transceiver. By control of the selector assembly 48 through manual positioning of switch 42 connected thereto, the monitor 34 may also be connected to the amplifier 50 and the pick-up device 46 disconnected therefrom. At the same time, the speaker 64 would be disconnected from the transceiver through the selector assembly 48 so that the monitor 34 will then replace or be operatively substituted for the pick-up 46 and speaker 64. In this manner, the transeiver 52 may be connected to the monitor in order to enable operation of the transceiver with the same voice-controlled switching facilities.

Referring now to FIGURE 4, one specific embodiment of electrical circuitry is disclosed for carrying out the aforementioned principles. The circuitry will therefore be housed within the cradle housing 22 with the pick-up component 46 and the speaker device 64 properly positioned in operative relation to the telephone handset 20 when placed upon the cradle housing. The pick-up device 46 includes the pick-up coil 72 which is operatively coupled by an impedance matching transformer 74 to the base emitter circuit of a class A amplifying transistor 76 of the signal amplifying stage 50, when the switch element 78 of the selector switch assembly 48, is in the illustrated position engaging contact 80. The switch 78 is therefore connected to the base 82 of transistor 76 through the coupling capacitor 84 and to the emitter 86 through the by-pass capacitor 88 and an impedance including resistor 90 and capacitor 92 connected in parallel. A coupling circuit is thus established between the pick-up coil 72 and the emitter through the conductor 94 and the resistor 90 and capacitor 92 in parallel therewith, and through the switch element 78 and coupling capacitor 84 to the base of the transistor. A negative bias is applied to the base 82 by the battery 96, the positive terminal of which is connected by the conductor 98 and the switch element 100 to the coupling circuit for the emitter through conductor 102. The negative terminal of the battery is connected through the bias resistor 104 to the base. Also, an output load in the form of the transformer primaries 108 and 110, is connected between the collector 106 of the transistor and the negative terminal of the battery. It will therefore be apparent, that a signal voltage applied to the base 82 of the transistor by means of the coupling circuit established from the pick-up coil 72 through the switch element 78, will produce an output current in the transformer primaries 108 and 110 which is substantially proportional to the signal voltage induced in the pick-up coil through the magnetic flux created by the telephone handset earphone while the telephone subscriber is speaking. Alternatively, when the switch element 78 engages the contact 112, the pick-up coil will be disconnected from the base of the transistor 76, the base then being coupled by conductor 114 to the microphone end 116 of the monitoring handset 34. Accordingly, the audio input signal will then be derived from the handset 34. In the illustrated position, the conductor 114 is connected to the conductor 94 through the resistor 118 for the purpose of conducting a varying current corresponding to voice impulses imposed on the microphone end 116.

The amplified audio input signal whether derived from the pick-up coil 72 or the handset 34, appearing in the form of an output current in the primary section 110 of the impedance matching transformer 120 is coupled by the secondary section 122, conductor 124 and the switch element 126 in either operative position thereof, to the microphone input 128 of the transceiver so that the message may be dispatched or transmitted by the transceiver. The secondary section 122 is also connected by the conductor 130 to the earphone end 132 of the monitoring handset 34 so that the audio input signal may be monitored when derived from the pick-up coil 72. Therefore, the conductor 124 connecting the other terminal of the secondary 122 to the microphone input 128 of the transceiver, is also connected through the resistor 134 and conductor 136 to the earphone end 132 of the handset. It will be apparent, that in the illustrated position of the selector switch assembly 48, the output secondary section 122 of the signal amplifying component 50 will be connected across the earphone end terminals of the monitoring handset 34 in series with only the fixed resistor 134. The primary section 108 of the transformer 120 also inductively couples the amplified audio input signal to the amplifier stage 54 through the secondary section 140 and coupling capacitor 142 to the base 144 of transistor 146. A reverse biasing resistor 148 is connected between the base 144 and the positive potential line 94 operative to prevent oscillations and stabilize the second amplifying stage 54. Thus, the signal output from the first amplifier stage 50 will be further amplified by the transistor 146, the emitter 147 being similarly coupled to the pick-up coil and positive terminal of the battery 96 by a coupling circuit including the parallel connected resistor 150 and capacitor 152 and the conductors 154 and 102 connected to the positive terminal of the battery in each of the operative positions of the switch element 100. An impedance matching transformer 156 couples the ouput of the amplifier stage 54 through the collector 158 to the base 160 of the third stage transistor 162, the primary output load of the second stage transistor 146 being connected to the negative terminal of the battery through the conductor 164. Similar connections to the battery and the input signal are established between the emitter and collector of the third stage transistor 162 for further amplifying the control signal voltage appearing on the base 160 thereof by virtue of the inductive coupling established by the transformer 156. The outmost signal of the third stage transistor 162 is therefore conductively coupled through the impedance matching transformer 166 to the base 168 of the fifth stage transistor 170 having an emitter 172 receiving the input signal through the resistor 174 and the conductor 154 and also has an output collector 176 connected through the current rectifying diode 178 to the negative terminal of the battery and to the parallel connected relay coil 180 of the relay component 60. The resistor 182 also connects the negative terminal of the battery to one terminal of the microphone end 116 of the monitoring handset 34.

It will become apparent that the fifth stage amplifier 58 being coupled to the output transformer 166 of the third stage 56, through the current rectifying diode 184 and the resistor 186 connected to the base 168, will be operative to establish a D.C. energizing current in the relay coil 180 when signal voltages originating from either the pick-up coil 72 or the monitoring handset microphone 116, are being amplified by the plural amplifier stages. Energization of the relay coil 180 under these conditions will close the normally opened relay conditioning switch 186 connected in parallel with the series connected capacitor 188 and resistor 190 for energizing the transmit-relay of the transceiver through lines 192 and 194 in order to condition the transceiver for transmitting operation.

Since some transceivers are so constructed that energy is normally applied to a relay located in the transceiver, which conditions the unit for receiving, it is necessary to remove or cut-off this energy in order to condition the series switching transceiver for transmitting operation. Accordingly, the circuitry of device 10 is provided with a switch 196 and line 198 to accomplish this objective by electrically replacing contact 186 and line 192. Thus, when coil 180 is energized, contact 196 is opened to cut off the energy which is normally applied to the transmit relay in the transceiver thereby causing the transceiver to be conditioned for transmitting operation. For series switching transceivers, the jumper element 200 is relocated in the device 10 so as to be connected between the terminals as shown by the dotted line position of the jumper element 200′. It will therefore be apparent, that energization and deenergization of the relay coil 180 will be operative to properly condition the transceiver in accordance with the presence or the absence of an audio input signal derived energizing current.

When the transceiver 52 is in a receiving condition occuring when the relay coil 180 is deenergized, any audio signal output of the transceiver is conductively coupled by the transformer 202 of the transceiver to the speaker coil 204 of the transceiver through the normally closed disabling switch 206 of the relay component 60. Accordingly, the grounded secondary 208 of the transformer 202 is connected by line 210 to the normally closed switch 206 which in turn is connected by the lines 212, 214, switch 216 in the illustrated position and in the off positions and line 218 to the grounded speaker coil 204 of the transceiver. It will therefore be apparent, that the transceiver speaker 204 and the device speaker 64 will be operative when the relay coil 180 is deenergized and the selector switch assembly 48 is either in the off position or in the illustrated operative position. On the other hand, the transceiver speaker may be disconnected by either the disabling switch 206, or by the switch assembly 48 so as to prevent reception. When the selector switch assembly 48 is positioned to its intermediate position with the switch element 216 engaging the intermediate contact 220, the transceiver speaker will also be disconnected because line 214 will no longer be connected to line 218. Under these conditions, the output secondary 208 of the output transformer 202 will be connected through the disabling switch 206 and the selector switch 216 to one terminal of the handset earphone end 132 through the volume control resistor 44, the other terminal of which is grounded in common with the grounded terminals of the primary 222 of transformer 224 and speaker coil 226 of the speaker component 64 and the speaker coil 204 of the transceiver. Thus, the earphone end of the monitoring handset 34 will replace the transceiver speaker in the latter noted position of the selector switch assembly 48 with a volume level control being provided for such purposes. It will also be recalled that in the same position of the selector switch assembly 48, the switch element 78 will connect the microphone end 116 of the handset 34 to the signal amplifying stage 50 so that the output thereof may be coupled by the transformer secondary 122 to the microphone input 128 of the transceiver. In the off position of the selector switch assembly, all of the switch elements except for the switch element 216 will be in non-contact position, the switch element 216 only being electrically connected to the line 218 so as to maintain the circuit for the transceiver and device speaker coils closed. The transceiver 52 may then be operated independently of the intercommunication device 10.

The hold circuit 67 is provided so that a pause in the conversation derived either from the telephone subscriber through the pick-up coil 72 or from the handset 34, will be operative to automatically switch the transceiver to its receiving condition from the transmitting condition in which it is held by energization of the relay coil 180. It will be observed therefore, that the amplifying stage 58, the output of which establishes the energizing current for relay coil 180, is connected to the current rectifying diode 184 in parallel with a storage capacitor 228 operative to build up a charge from the D.C. component of the amplified signal obtained from the coupling transformer 166. The charge stored within the capacitor 228 is therefore bled through the resistor 187 at a rate insufficient to deplete the charge being stored in the capacitor 228 when the audio signal is being amplified but sufficient to bias the transistor 170 to a conductive state for conducting the energizing current through the relay coil 180. When there is a pause in the conversation, so that no amplified signal current is available to maintain the charge in the storage capacitor 228, it will discharge at a rate determined by the relative values of capacitance and resistance of the capacitor 228 and resistor 187 respectively, so that after a predetermined pause, the transistor 170 will be rendered non-conductive to cause deenergization of the relay coil 180 thereby conditioning the transceiver 52 for receiving operation. It will also be appreciated that by varying the resistance value of resistor 187 the holding time could be adjusted to any reasonabl desired length of time, to accommodate different speech rates. The foregoing voice-controlled switching of the transceiver will therefore be available regardless of the source from which the audio-input signal is derived as hereinbefore indicated.

In order to prevent an audio-input signal from switching the transceiver to the transmitting operation while the transceiver is receiving an audio output signal null circuit 68 is provided including, the primary 222 of the transformer 224 connected in parallel with the transceiver coil 204 and the speaker coil 226, to the secondary 208 of the output transformer 202. Accordingly, the output signal from the transceiver will be operative to induce a control signal current in the secondary 230 of the transformer 224 which is connected to the base-emitter circuit of the transistor 232. The signal current induced in the transformer secondary 230 will therefore be operative to render the transistor 232 conductive so as to establish a low resistance shunting path parallel to the storage capacitor 228 in order to prevent the accumulation of any charge therein by any output signal that may appear in the secondary of the coupling transformer 166. Accordingly, the transistor 170 will be maintained in a non-conductive state so as to maintain the relay coil 180 deenergized even if an audio input signal is being amplified through the amplifier stages 50, 54 and 56. The null circuit 68 is thereby effective to prevent switching of the transceiver to the transmitting condition while it is receiving. However, should the transceiver 52 be in a transmitting condition with the relay coil 180 energized, opening of the disabling switch 206 would prevent development of the control signal in the transformer secondary 230 as well as to prevent operation of the speaker coils 204 and 226 and the speaker coil in the earphone end 132 of the handset 34.

Summarizing the operation of the intercommunication device of the present invention, it will be recalled that when the selector switch assembly 48 is moved to the position illustrated, and the telephone handset placed with the earphone end 30 adjacent to the pick-up coil 72 and the microphone end 32 adjacent to the speaker device 64 after the telephone subscriber has been dialed, amplification of the signal voltage induced in the pick-up coil through the signal amplification stage 50 and the control amplification stages 54 and 56, will produce a signal current output rectified by the diode 184 to store a charge in the storage capacitor 228 so that the charge may bleed off through the resistor 187 rendering the transistor 170 conductive to establish a time delayed energizing current path in order to energize the relay component 60. Energization of the relay component 60 will therefore be operative to condition the transceiver for transmitting operation in order to transmit the audio-modulating signal derived from the output winding 122 of the coupling transformer 120 connected to the output base collector circuit of the signal amplifying transistor 76. The transistor 76 is therefore normally biased by the negative battery potential through the bias resistor 104, so that a signal voltage appearing on the base 82 of the transistor is effective to produce a relatively low gain, amplified current in the transformer primary sections 108 and 110. The signal is applied to the base-emitter circuit of the transistor 76 by a coupling circuit having connected in parallel therewith, the capacitor 88 operative to bypass away from the base undesirable high frequency voltage transients that may be produced by the transceiver and picked up by the pick-up coil 72. The output of the transistor 76 as hereinbefore indicated will be coupled through the secondary 122 to the signal modulating input of the transceiver. The secondary section 140 and capacitor 142 also couple the output signal to the base of the transistor 146, the resistor 148 imposing on the base a slightly reversed bias overcome during the transmission of the modulating signal, to prevent oscillation and add stability. Further amplification of the output of the transistor 146 and the transistor 162 is thereby effected before being applied to the transistor 170 through which the energizing current is established. When howeven the transceiver has been in a receiving condition, the existence of an audio output therefrom will be operative through the transformer 224 to render the nulling transistor 232 conductive in order to prevent the transistor 170 from becoming conductive by shunting capacitor 228. However, once the transistor 170 is conductive, so as to effect and maintain the transceiver in a transmitting condition, a predetermined time interval is required before the capacitor 228 is discharged and the transistor 170 is rendered non-conductive following the cessation of a signal amplified through the amplifier stages 50, 54 and 56. Voice-controlled switching is thereby provided with facilities for preventing switching to the transmitting condition while the transceiver is receiving. Also, because of the disabling switch 206, which is opened by energization of relay coil 180, disconnection of the transceiver speaker coil, the speaker coil 226 of the device, the transformer 224 and the speaker of the handset 34 is effected so as to avoid interference with the audio signal being amplified and transmitted due to any voltage transients or signals appearing across the transformer 202 at the time the transceiver is switched to the transmit condition. When the selector switch assembly 48 is positioned to the intermediate position, the speaker components 64 and the transceiver speaker are cut out of the circuit while the earphone end 132 is cut into the circuit through the volume control 44 so as to receive the audio output signal from the output transformer 202 of the transceiver. At the same time, the transceiver input 128 is connected to the microphone end 116 of the handset. The voice-controlled automatic switching facilities of the device 10 may thereby be applied to the transceiver 52 even when the device 10 is not being utilized for radio-telephone intercommunication purposes.

Also contemplated pursuant to the principles of this invention is the miniaturization of the radio components so that they could all be housed within a common housing with the device 10. This would render the invention adaptable as a low-powered portable 2-way radio unit. An FCC license would not be required for operation of such a unit because of its short range and limited power. Thus the invention also embraces compact, unitized intercommunication means capable of providing a wireless telephone extension, when used with an additional portable type of two-way radio.

From the foregoing description, the operation and utility of the intercommunication system of the present invention will be apparent. It will therefore be appreciated, that the intercommunication system of the present invention will be operative to automatically establish a voice-controlled communication link between a radiant energy system as exemplified by a two-way radio system and a guided energy system as exemplified by a commercial telephone system, respectively having message receiving and message dispatching components. It will be further appreciated, that the intercommunication system establishing the aforesaid link does not exercise any control over the guided energy system nor the components thereof, but is restricted to the automatic switching control of the radiant energy system components so as to avoid interference therebetween. It will also be appreciated, that the construction and operational attributes of the apparatus will facilitate establishment of the intercommunication link and eliminate the need for human supervision thereover because of its automatic attributes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an intercommunication link between a telephone and a two-way radio having a relay energized to switch the radio from receiving operation to transmitting operation and a pick-up coil within which an audio modulating signal is induced by the telephone, control means for switching the radio from receiving to transmitting operation by audio signals originating from the telephone comprising, power amplifying means connected to the relay and rendered operative for supply of energizing current thereto, signal connecting means establishing a signal path between said pick-up coil and the power amplifying means for developing said energizing current in response to said audio modulating signal induced in the pick-up coil, storage capacitor means connected to the power amplifying means for holding the same operative during pauses in the audio modulating signal of less than a predetermined duration, current conducting means connected to said signal path in shunt relation to said capacitor means for holding the power amplifying means inoperative during receiving operation of the radio, coupling means responsive to audio signals from said radio during receiving operation for rendering said current conducting means conductive to establish a low resistance path shunting said capacitor means, switch means responsive to energization of the relay for disconnecting the coupling means from the current conducting means during transmitting operation of the radio to prevent establishment of said low resistance path, a monitoring handset connected to the signal connecting means and the coupling means for receiving audio signals from either the telephone or the radio, and selector means operatively connecting the monitoring handset in by-pass relation to the pick-up coil for voice-controlled switching of the radio through audio signals originating from the monitoring handset.

2. The combination of claim 1 including, a housing enclosing said control means, speaker means mounted in the housing and connected to the radio, and handset supporting means formed on said housing for holding the monitoring handset in a predetermined position thereon spaced from the speaker to permit broadcast therefrom to persons in the vicinity.

3. The combination of claim 2, wherein said handset supporting means comprises, a top supporting portion on the housing, a pair of spaced recesses formed on said top supporting portion by a pair of vertical walls, one of said walls having a spacing shoulder for supporting the handset in spaced relation to the top portion of the housing within one of said recesses, and the other of said vertical walls being downwardly inclined toward said one wall for firmly holding the handset within the other of said recesses.

References Cited by the Examiner

UNITED STATES PATENTS

| | | | |
|---|---|---|---|
| 2,501,955 | 3/50 | McWane | 179—1 |
| 2,564,660 | 8/51 | Allen | 325—22 X |
| 2,603,719 | 7/52 | Riebe | 179—100 |
| 2,640,109 | 5/53 | O'Neil | 179—100 |
| 2,699,469 | 1/55 | Thomas et al. | 179—100 |
| 2,766,324 | 10/56 | Peth | 325—22 |
| 2,858,420 | 10/58 | Lutz | 325—55 |
| 2,935,605 | 5/60 | Mathieu | 325—22 X |
| 2,952,739 | 9/60 | Lehman | 179—1 |
| 2,987,575 | 6/61 | Chalfin | 179—1 |
| 3,030,446 | 4/62 | Briggs | 179—1 |
| 3,065,421 | 11/62 | Hart | 325—55 |
| 3,073,911 | 1/63 | Mattke | 179—100 |
| 3,100,818 | 8/63 | Carter | 325—55 |

FOREIGN PATENTS

| | | |
|---|---|---|
| 1,183,332 | 7/59 | France. |

DAVID G. REDINBAUGH, *Primary Examiner.*